Patented Mar. 26, 1929.

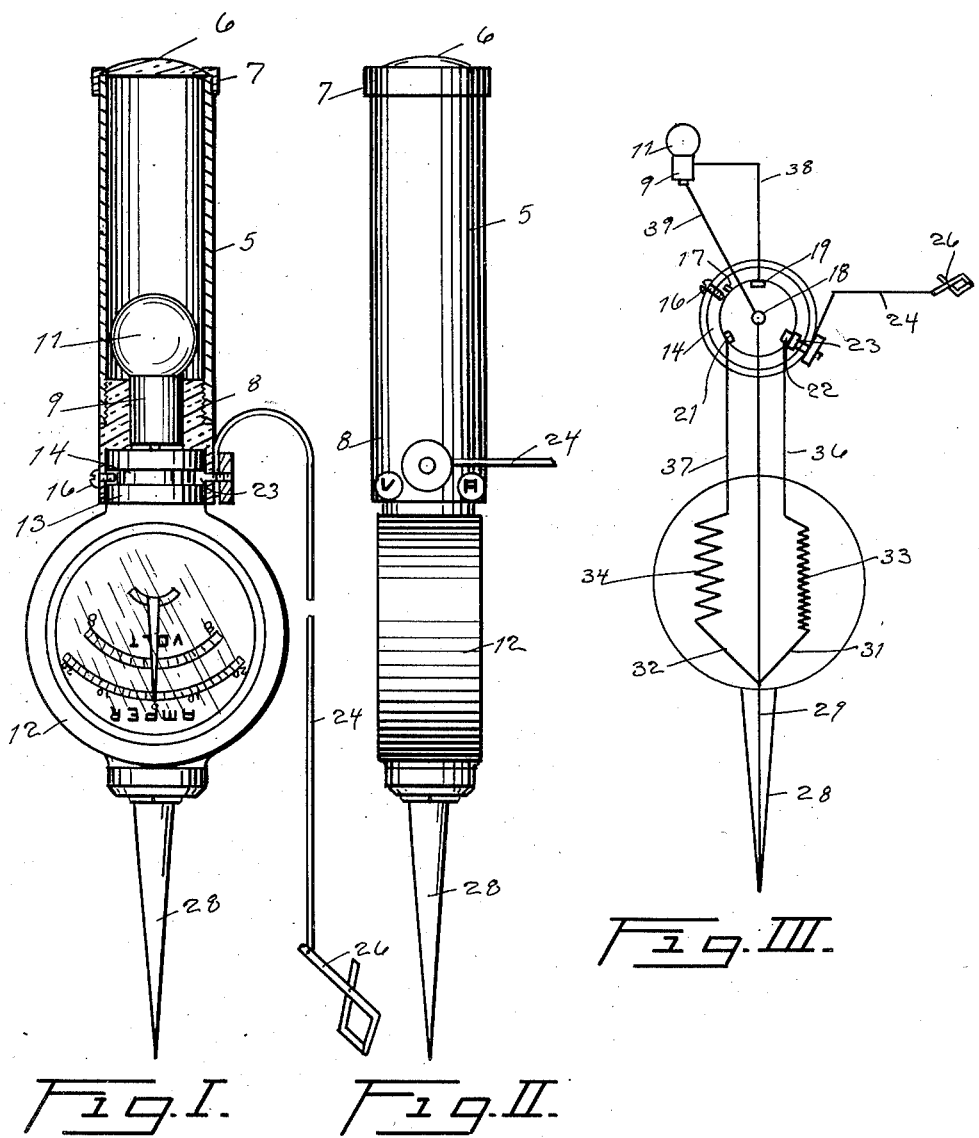

1,707,051

UNITED STATES PATENT OFFICE.

ANATOLY COLOSOFF, OF SAN FRANCISCO, CALIFORNIA.

TESTING DEVICE.

Application filed February 2, 1926. Serial No. 85,541.

This invention relates to improvements in testing devices and has particular reference to a device for use in connection with automobiles or wherever an electric circuit is employed.

The principal object of this invention is to produce a device which may be used to test either the voltage or amperage of an electric circuit or to be employed as a light so as to give visible indication when a break in the circuit has been found.

Another object is to produce a device of this character which is so constructed as to form a unitary device.

An additional object is to produce a device which is simple in construction and, therefore, cheap to manufacture.

Other objects and advantages will be apparent during the course of the following description.

In the accompanying drawings forming a part of this specification, and in which like numerals are employed to designate like parts throughout the same, Figure I is a front elevation of my device partly broken away, in order to better illustrate the interior thereof, Figure II is a side elevation of Figure I, and Figure III is a diagrammatic view showing the wiring of my device.

It often occurs in electrical apparatus that a broken wire may exist under the insulation, with a result that the break is hard to find. It is, therefore, necessary to tap the different wires in the electrical circuit, at different points, in order to get a bridge around the break. It is, therefore, essential to have an instrument which will function to indicate visibly the fact that the break has been located.

By viewing Figure I, it will be noted that I have provided a tubular handle 5 having an open end which is normally closed by a lens 6. This lens 6 is retained upon the handle 5 as by a ring 7. The opposite end of the tubular handle 6 has screwed thereinto an insulating plug 8, within which is mounted the base 9 of a bulb 11.

At 12 I have shown the casing of a combined amp-volt meter which is provided with an extension base 13 having an annular groove 14 formed therein. A screw 16 extends through the insulating member 8 into the groove 14 and is adapted to be contacted by a pin 17 carried in the extension 13, thereby limiting the extent of rotation between the handle 5 and the meter.

The extension 13 has mounted therein contacts which are diagrammatically shown in Figure III and bear the numerals 19, 21 and 22, while a contact 18 is centrally positioned in the base and contacts the bottom of the base of the bulb 11.

A spring-pressed contact 23 is secured in the insulating member 8 and extends into the annular groove 14 as shown in Figures I and III. This contact has connected thereto a cable 24 to the free end of which is attached a clip 26. A contact point 28 is secured to the amp-meter housing 12 and has connected thereto a common lead 29 (see Figure III). This common lead is attached to the contact 18 and has branch leads 31 and 32 extending to the volt meter and the amp-meter windings which are designated at 33 and 34, respectively.

A wire 36 extends from the volt meter winding and is connected to the contact 22. A similar wiring 37 extends from the amp-meter winding to the contact 21. A wire 38 extending from the contact 19 to the base 9 of the bulb, while the center contact carried on the base of the bulb rests against the contact 18. In the diagrammatic drawing this connection is designated by the wire 39.

The operation of my device is as follows:

Assuming that it is desired to take a voltage meter reading, the clamp 26 is attached to the frame of the machine or to one side of the circuit, the handle 5 is rotated with respect to the meter so as to move the spring contact 23 into contact with the contact 22, thus completing the circuit from the clamp to the contact point 28.

By now touching the contact point 28 to the opposite side of the circuit, the result will be that the current flowing through the device will give a voltage flow. By turning the handle still farther so as to bring the contact 21 into contact with the spring contact 23 and perform the same operation, the amperage may be observed. Should one desire to merely locate a break, then the handle is rotated so that the contact 19 is in engagement with the contact 23 which will result in a current flowing through the bulb 11 when a circuit is completed.

By now employing the device in the same manner and by successively touching various points in the circuit with the contact point 28, the user will immediately know when the circuit is completed by the fact that the bulb 11 will become illuminated which will be visible in the lens 6. This arrangement also permits the device to be used as a trouble lamp for investigating about the machine.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a tubular handle, a bulb positioned therein, a meter rotatably secured to said handle, a contact point secured to said meter, and means for controlling the flow of current to said meter and said bulb independently.

2. In a device of the character described, a tubular handle having a lens formed in one end thereof, a bulb positioned within said handle, and adapted to illuminate said lens, a meter rotatably secured to said handle, a plurality of contacts mounted on said meter, a stationary contact mounted on said handle in such a manner as to be thrown into successive engagement with the contacts on said meter, means for conducting the current to said stationary contact, a pointer secured to said meter and being electrically connected to said contacts in said meter.

3. In a device of the character described, a tubular handle having a lens formed in one end thereof, an insulating member secured to said handle, a bulb positioned in said tubular handle, a meter rotatably secured to said handle through the medium of an extension formed thereon, said extension having an annular groove formed therein, a plurality of contacts positioned within said annular groove, a stationary contact carried on said insulating member, a conductor secured to said last mentioned contact, a contact point secured to said meter, a wire secured to said point, said wire being adapted to conduct electric current to said meter, and means for conducting electric current from said meter to said contacts on said extension and to said bulb positioned in said handle.

In testimony whereof I affix my signature.

ANATOLY COLOSOFF.